Nov. 5, 1929.  W. M. CHESNUTT  1,734,363
SWIVEL CASTER
Filed Sept. 19, 1927

Inventor
WM. M. CHESNUTT
By Earl M. Sinclair
Attorney

Patented Nov. 5, 1929

1,734,363

UNITED STATES PATENT OFFICE

WILLIAM MORTON CHESNUTT, OF FRESNO, CALIFORNIA, ASSIGNOR TO JOHN LOUCIEN CHESNUTT, OF LONG BEACH, CALIFORNIA, AND FISK MARK RAY, OF OAKLAND, CALIFORNIA

SWIVEL CASTER

Application filed September 19, 1927. Serial No. 220,371.

The principal object of this invention is to provide an improved swivel caster of double ball bearing construction, so designed as to secure a simple and economical manufacture and assembly as well as to facilitate the renewal of parts, and one which possesses the advantages of increased durability, improved and lasting swiveling efficiency and reduced tendency to get out of good working order.

A further object is to provide an improved construction for a swivel caster, so designed that it may be adapted with slight changes and expense to use with wheels of widely varying diameter, as required for various kinds of service, of both single and double wheel design.

Another object of the invention is to provide an improved swivel caster in which the connecting means between the swiveling parts and the wheel is so arranged as to be closed to provide a cavity for lubricant and also to exclude dust, dirt, water, and other foreign substances.

A further object of the invention is to provide a swivel caster having improved hardened steel ball race members so constructed as to act as spacers for the swiveling parts and also adding strength and rigidity to resist the bending or distortion of the central connecting member.

With these and other objects in view, my invention consists in the construction, arrangement and combination of elements hereinafter set forth, pointed out in the claims and indicated by the accompanying drawing in which:

Figure 1:
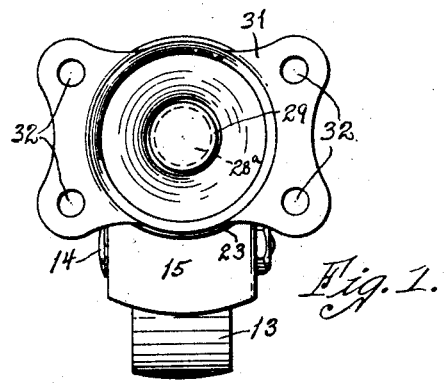
Fig. 1 is a plan view of a plate type of single wheel caster embodying my improvements.

In the construction of the device as shown, I employ a substantially cylindrical housing 10, which incloses the swiveling parts and which in the construction shown in Figs. 1 to 4 inclusive, is formed with a pair of spaced downwardly extending wings 11 and 12 between which a floor wheel 13 is arranged for rotation on an axle 14. As here shown, the axle 14 is located rearwardly of the vertical axis of the housing 10 and of the swiveling devices and the wings 11 and 12 and housing are formed with a rearwardly extending flange 15 which partially overhangs the wheel and serves to strengthen the parts.

The housing 10 preferably is formed with an internal horizontal flange 16 between its upper and lower margins and said flange is concaved on both its upper and lower faces to provide seats for annular ball race members 17 and 18 respectively. The ball race members 17 and 18 are formed of hardened steel of superior wear-resisting quality and have a drive fit in their seats, whereby they tend to remain in place and yet may be removed when desired, for the substitution of new parts when the old ones have become worn or broken. If desired, the ball race members 17 and 18 may be formed at their inner margins with peripheral flanges 19 and 20 respectively, whch are in contact with each other when the members are assembled. The ball race members 17 and 18 preferably are identical in form and shape with each other to save expense in manufacture and to reduce the number of parts, but when mounted in place, they occupy relatively inverted positions.

Figure 3:
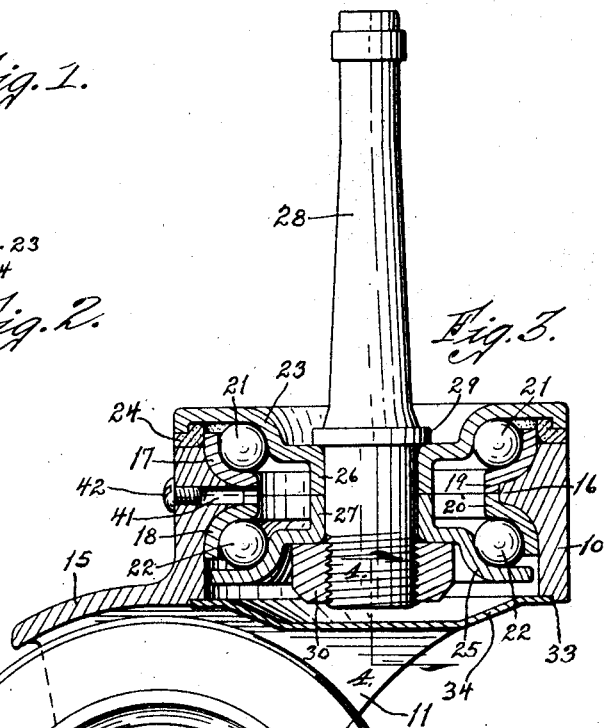
Fig. 3 is a vertical section illustrating a stem type of caster and showing fully the construction of the anti-friction swiveling parts.

An annular row of bearing balls 21 is mounted in the upper ball race member 17 and a similar row of balls 22 is mounted in contact with the lower ball race member 18. A coacting ball race member 23 is mounted over the upper row of balls 21 and said member is extended outwardly to overlie the housing 10. A washer 24 of felt or other suitable material is inserted between the outwardly extending portion of the ball race member 23 and the upper margin of the housing 10 so as to exclude dirt and water from the swiveling parts of the device. A coacting ball race member 25 is mounted below the lowermost row of balls 22 and serves to hold said balls in position. The ball race members 23 and 25 are formed at their inner margins with vertical peripheral flanges 26 and 27 respectively and the adjacent margins of said flanges are in contact with each other. The flanges 26 and 27 form a central bore to receive a connecting member such as a stem 28 in the type shown in Fig. 3. The stem 28 is formed between its ends with a peripheral flange 29 which contacts the upper ball race members 23 and at its lower end is formed with a suitable means for binding the parts together by contact with the lowermost ball race member 25. This may be done by upsetting the lower end of the stem, but preferably, the stem is threaded at its lower end, as shown in Fig. 3, to receive a nut 30, which may be removed at times for access to the swiveling parts for the purpose of renewal of members which may have become broken or badly worn.

Figure 2:
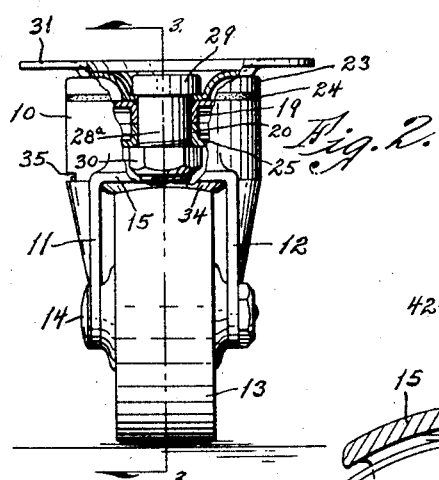
Fig. 2 is a front elevation of the same, partly in section to show some of the connecting means for the swiveling parts.

In the construction shown in Figs. 1 and 2, wherein the plate type of caster is shown, the stem 28ª does not extend above its flange 29, but a top plate 31 is provided and is formed with a central aperture to receive said stem and is engaged beneath the flange or head 29 of the stem. The plate 31 is formed with any suitable number of screw holes 32 by means of which it may be attached to a load object whereas the stem 28 of the type shown in Fig. 3 is designed to be received in a socket or sleeve of the load object in a common and well known manner.

Figure 4:
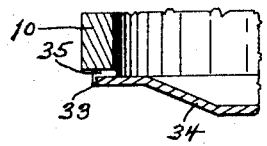
Fig. 4 is a detail section on the line 4—4 of Fig. 3, showing the means for removing the grease-retaining plate.

At its lower margin, the housing 10 preferably is formed with a rabbet 33 to receive a pressed steel plate 34 which is employed to close the lower end of the housing. By this means the interior of the housing may serve as a cavity to receive lubricant and at the time of assembly, this cavity preferably is filled with hard grease which lubricates the moving parts. The plate 34 also serves to exclude dirt and other foreign substances from the swiveling parts. The lower edge of the housing may be formed with a notch 35, as shown in Fig. 4, for the insertion of a sharp tool to remove the plate 34 when desired, for refilling the cavity with grease, or otherwise for obtaining access to the swiveling parts for any desired purpose.

Figure 5:
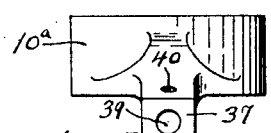
Fig. 5 is a rear elevation of a modified form of housing for the swiveling parts having connecting means particularly adapted for use with the double wheel construction.
Figure 6:
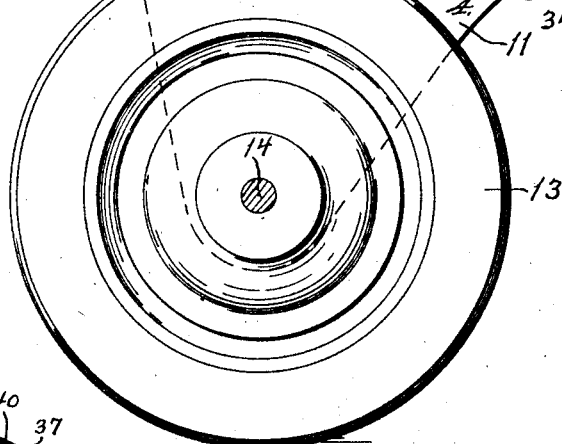
Fig. 6 is a side elevation of the members shown in Fig. 5, partly in section.

As shown in Figs. 5 and 6, the housing 10ª is not formed with the spaced wings to engage on opposite sides of a single wheel, but rather it is formed with downwardly extending bosses 36 and 37 respectively, at its front and rear sides. The bosses 36 and 37 are designed to extend between and to serve as connectors for portions of a double wheel construction such as is particularly described and claimed in my companion application and said bosses are formed with horizontal apertures 38 and 39 respectively, to facilitate such connection. The boss 37 also is formed with a threaded aperture 40 to receive a set screw (not shown), which is a part of the connecting means. The modified construction of Figs. 5 and 6 is shown to indicate how the improved swiveling means may be modified to only a slight degree to adapt it for use with various types of wheels, not only of single, but also of double construction, it being the idea that the parts inclosed by the housing 10ª need not be of any different construction from those shown and described in detail in connection with Fig. 3.

The housing 10 may also be formed with an oil or grease aperture 41 which is extended through the adjacent flanges 19—20 of the ball race members to permit the insertion of lubricant to the swiveling members after the device is placed in use. The aperture 41 normally is closed by means of a screw 42 or other suitable means.

The caster constructed as shown and described, with the housing 10 and its connections for carrying the wheel and with its means for providing supports for the ball races 23 and 25 and their interengaging flanges 26 and 27 which act as spacers and as a means for connecting the parts through the stem 28 or 28ª, provides a very efficient as well as simple and economical form of swiveling caster. The ball race member 25 is a duplicate of the major portion of the ball race 23 and may be formed with the same die employed for the member 23 and it has already been noted that the members 23 and 25 are duplicates of each other. This arrangement obviously reduces considerably the cost of manufacture as well as the number of parts required for the device. All the ball race members are or may be of hardened steel so as to increase their service qualities and also are arranged so as to be readily removable and replaceable. By extending the stem 28 or 28ª through the flanges 26 and 27 of the outer ball race members I provide a rigid and efficient construction and one which will resist any bending or distortion of the parts under heavy loads. By extending the ball race member 23 beyond the upper row of balls 21 and into overhanging relation to the housing 10 and by providing the lower closing plate 34 for the housing, I have secured a dirt and water proof construction for the swiveling parts and also have provided a cavity for lubricant of sufficient quantity to lubricate the moving parts for a considerable period of service, thus increasing the efficiency of the caster. It should be noted that this construction is made possible by employing the outer swiveling member or housing 10 for the connection to the wheel through the wings 11 and 12 or the members 36 and 37 of Figs. 5 and 6.

My improved design for the housing 10 makes it readily adaptable, by slight changes in the wheel connecting parts, to the mounting of either a single wheel or double wheels as well as to the mounting of wheels of various diameters without changing the swiveling parts nor that part of the housing which incloses the swiveling parts. This arrangement reduces the cost of manufacture and assembling of the parts as far as possible below the prohibitive or impracticable cost so that the manufacturer need not carry an unduly large stock or variety of different parts. It is well known that the use of twin or double wheels is often desirable, as such arrangement has a combined width of tread equal to the tread of a single wheel and yet having less wear on a floor surface and the swiveling is easier than with a single wheel. Furthermore, a caster having a wheel of large diameter will roll upon or off of a rug or over uneven surfaces more readily and with less jar than a similar caster having a considerably smaller wheel; and where the load weight is not increased materially the wheel of larger diameter will not require a change in the swiveling parts from that used with a wheel of smaller diameter. It is important to devise a housing member such as 10 that is thus readily adaptable to use with many different wheels because it enables the caster to be adapted to a wider field of service without adding a considerable expense which would otherwise be involved. The housing 10 is adapted to the mounting of single wheels of larger diameter merely by lenghtening the wings 11 and 12 proportionately and is adapted to the mounting of a twin wheel assembly by substituting the bosses 36 and 37 of Figs. 5 and 6 without necessarily making changes in the parts inclosed by said housing. When it is desired to mount wheels of larger diameter, of either the single or double type, and the load weight is to be increased within certain limits, that part of the member 10 which incloses the swiveling parts may be elongated and the width of the flange 16 which spaces apart the ball races may be proportionately increased. This change does not require a change of the ball race members 17, 18, 23, and 25 or of the plate 35, as to diameter or otherwise, except an increase of the length of the spacing flanges 26 and 27.

The length of the stem may of course be increased if necessary.

The object in thus further spacing apart the ball races when a heavier load is to be carried is to maintain a certain proportion of strain between the parts involved, conducive to less wear and protection of the parts. It should be noted that when the vertical plane of the axle 14 is positioned outside of the ball races of the swiveling parts, the force or weight of the load exerted by the axle upon the wings 11 and 12 or on the equivalent parts of the twin wheel construction, acts in the manner of a lever to lift the load weight carried by the rear balls 21 of the upper race with a fulcrum upon the front balls 22 of the lower race; and therefore, by increasing the vertical distance between the two ball races it tends to decrease the leverage between the two swiveling points referred to. Within certain limits it is more desirable to decrease the leverage between these two points by increasing the vertical distance between the ball races than it is to increase the diameter of the ball races, for the reason that the latter change would add the expense of an additional number of balls besides the additional cost of larger ball races and other parts without materially increasing the bearing surface in contact with the balls at either point referred to while under the lever action.

Therefore, it is evident that my design for housing and connecting the ball races or swiveling parts to the wheels affords the advantages of being readily adapted to a wide range of wheels of varying diameter and to a correspondingly wide field of service with comparatively small change of parts and correspondingly small expense.

I claim as my invention:

1. A swivel caster comprising a housing member having projections constituting part of a wheel-carrying means, a ball race within said housing, another ball race in said housing above the first mentioned ball race, a series of bearing balls engaging each of said races, coacting ball races engaging the bearing balls of each of the first mentioned races, said coacting ball races being formed with internal peripheral flanges together constituting a bore vertically of the housing, a securing member mounted through said flanges and binding the parts together, means associated with said securing member for attaching the device to a load object, the uppermost ball race being extended entirely across and over the second mentioned ball race to cover the upper end of said housing member and to form a closure therefor, said housing member being formed with a rabbet at its lower end, and a closing plate removably mounted in said rabbet and forming a closure at the lower end of said housing member.

2. A swivel caster comprising a housing member having projections constituting part of a wheel-carrying means, a frame structure mounted within said housing and revoluble relative thereto, bearing balls mounted between said frame structure and the housing wall, a securing means connected with said frame structure and arranged for attachment to a load object, the internal frame structure having a portion extending entirely over the bearing balls and overlying the wall of housing, and a closing plate removably mounted at the lower end of the housing and providing a closure therefor.

3. A swivel caster comprising a housing member having projections constituting part of a wheel-carrying means, a frame structure mounted within said housing and revoluble relative thereto, bearing balls mounted between said frame structure and the housing wall, a securing means connected with said frame structure and arranged for attachment to a load object, the internal frame structure having a portion extending entirely over the bearing balls and overlying the wall of the housing, a non-metallic washer mounted on the upper margin of the housing wall for sealing the joint with said overlying portion, and a closing plate removably mounted at the lower end of housing and providing a closure therefor.

WILLIAM MORTON CHESNUTT.